(12) United States Patent
Pietrzak et al.

(10) Patent No.: US 12,256,796 B2
(45) Date of Patent: Mar. 25, 2025

(54) HELMET

(71) Applicant: MIPS AB, Täby (SE)

(72) Inventors: Christopher Pietrzak, Täby (SE); Jack Liu, Yangchun (CN); Steven Wang, Yangchun (CN); Saman Xie, Yangchun (CN)

(73) Assignee: MIPS AB, Täby (SE)

( * ) Notice: Subject to any disclaimer, the term of this patent is extended or adjusted under 35 U.S.C. 154(b) by 44 days.

(21) Appl. No.: 18/079,393

(22) Filed: Dec. 12, 2022

(65) Prior Publication Data

US 2023/0109117 A1 Apr. 6, 2023

Related U.S. Application Data

(62) Division of application No. 16/766,410, filed as application No. PCT/EP2018/082126 on Nov. 21, 2018, now abandoned.

(30) Foreign Application Priority Data

Nov. 24, 2017 (GB) .................................. 1719559

(51) Int. Cl.
*A42B 3/06* (2006.01)
*A42B 3/12* (2006.01)
(Continued)

(52) U.S. Cl.
CPC .............. *A42B 3/064* (2013.01); *A42B 3/127* (2013.01); *F16F 7/08* (2013.01); *F16F 7/12* (2013.01);
(Continued)

(58) Field of Classification Search
CPC ..................................................... A42B 3/064
See application file for complete search history.

(56) References Cited

U.S. PATENT DOCUMENTS

| 1,772,915 A | 8/1930 | Roseberg |
| 3,727,429 A | 4/1973 | Downey |

(Continued)

FOREIGN PATENT DOCUMENTS

| CN | 101227842 A | 7/2008 |
| EP | 3117726 | 1/2017 |

(Continued)

OTHER PUBLICATIONS

International Search Report and Written Opinion dated Apr. 12, 2019 for International Application No. PCT/EP2018/082126.

*Primary Examiner* — Katherine M Moran
(74) *Attorney, Agent, or Firm* — Husch Blackwell LLP

(57) ABSTRACT

A helmet comprising first and second parts and a connector connecting the first and second parts of the helmet, the connector comprising: a first plate; a first anchor point on one side of the first plate, configured to be connected to the first part; a second plate located on an opposite side of the first plate from the first anchor point; a second anchor point on an opposite side of the second plate from the first plate, configured to be connected to the second part; a low friction interface provided between opposing surfaces of the first and second plates; and a cuff of deformable material provided around the first and second plates, and configured to at least partially cover the side of the first plate on which the first anchor point is located and to at least partially cover the side of the second plate on which the second anchor point is located.

19 Claims, 5 Drawing Sheets

(51) Int. Cl.
*F16F 7/08* (2006.01)
*F16F 7/12* (2006.01)
*A44B 11/04* (2006.01)
*A44B 18/00* (2006.01)

(52) U.S. Cl.
CPC ........... *A44B 11/04* (2013.01); *A44B 18/0003* (2013.01); *Y10T 24/13* (2015.01); *Y10T 403/453* (2015.01)

(56) References Cited

U.S. PATENT DOCUMENTS

| | | | |
|---|---|---|---|
| 4,063,433 A | 12/1977 | Chanton | |
| 6,658,671 B1* | 12/2003 | Von Holst | A42B 3/064 2/412 |
| 8,316,512 B2* | 11/2012 | Halldin | A42B 3/064 24/90.1 |
| 9,474,316 B2* | 10/2016 | Berry | A42B 3/064 |
| 9,987,544 B2* | 6/2018 | Sodec, Jr. | A42B 3/064 |
| 10,143,258 B2* | 12/2018 | Salmini | A42B 3/064 |
| 10,463,099 B2* | 11/2019 | Allen | A42B 3/283 |
| 10,602,794 B2* | 3/2020 | Thiel | A42B 1/08 |
| 10,779,601 B2* | 9/2020 | Lanner | A42B 3/127 |
| 11,464,270 B2* | 10/2022 | Coyle | A42B 3/0486 |
| 2004/0250340 A1* | 12/2004 | Piper | A42B 3/064 2/412 |
| 2015/0047109 A1 | 2/2015 | Grant et al. | |
| 2018/0213874 A1* | 8/2018 | Lanner | A42B 3/127 |
| 2020/0323299 A1* | 10/2020 | Kele | A42B 3/064 |
| 2023/0023020 A1* | 1/2023 | Pomering | A44B 17/0076 |

FOREIGN PATENT DOCUMENTS

| | | | |
|---|---|---|---|
| TW | 469117 | 12/2001 | |
| TW | 569673 | 1/2004 | |
| WO | WO 2001/045526 | 6/2001 | |
| WO | WO 2008004475 | 1/2008 | |
| WO | WO 2011/139224 | 11/2011 | |
| WO | WO 2015/177747 | 11/2015 | |
| WO | WO 2017/151028 | 9/2017 | |
| WO | WO 2017/157765 | 9/2017 | |
| WO | WO 2017/161459 | 9/2017 | |
| WO | WO 2017157765 A1 * | 9/2017 | A42B 3/064 |

* cited by examiner

HELMET

RELATED APPLICATIONS

This application is a divisional of U.S. patent application Ser. No. 16/766,410, filed on May 22, 2020, which is a 35 USC § 371 National Stage application of International Application No. PCT/EP2018/082126, entitled "CONNECTOR," filed on Nov. 21, 2018, which claims the benefit of United Kingdom Patent Application No. 1719559.5, filed Nov. 24, 2017 the disclosures of which applications are incorporated herein by reference in their entireties.

The present invention relates to a helmet comprising a connector, which may be used to connect two parts of the helmet, for example for connecting a liner or comfort padding to the remainder of a helmet.

Helmets are known for use in various activities. These activities include combat and industrial purposes, such as protective helmets for soldiers and hard-hats or helmets used by builders, mine-workers, or operators of industrial machinery for example. Helmets are also common in sporting activities. For example, protective helmets may be used in ice hockey, cycling, motorcycling, motor-car racing, skiing, snow-boarding, skating, skateboarding, equestrian activities, American football, baseball, rugby, cricket, lacrosse, climbing, golf, airsoft and paintballing.

Helmets can be of fixed size or adjustable, to fit different sizes and shapes of head. In some types of helmet, e.g. commonly in ice-hockey helmets, the adjustability can be provided by moving parts of the helmet to change the outer and inner dimensions of the helmet. This can be achieved by having a helmet with two or more parts which can move with respect to each other. In other cases, e.g. commonly in cycling helmets, the helmet is provided with an attachment device for fixing the helmet to the user's head, and it is the attachment device that can vary in dimension to fit the user's head whilst the main body or shell of the helmet remains the same size. In some cases, comfort padding within the helmet can act as the attachment device. The attachment device can also be provided in the form of a plurality of physically separate parts, for example a plurality of comfort pads which are not interconnected with each other. Such attachment devices for seating the helmet on a user's head may be used together with additional strapping (such as a chin strap) to further secure the helmet in place. Combinations of these and adjustment mechanisms are also possible.

Helmets are often made of an outer shell, that is usually hard and made of a plastic or a composite material, and an energy absorbing layer called a liner. Nowadays, a protective helmet has to be designed so as to satisfy certain legal requirements which relate to inter alia the maximum acceleration that may occur in the centre of gravity of the brain at a specified load. Typically, tests are performed, in which what is known as a dummy skull equipped with a helmet is subjected to a radial blow towards the head. This has resulted in modern helmets having good energy-absorption capacity in the case of blows radially against the skull. Progress has also been made (e.g. WO 2001/045526 and WO 2011/139224, which are both incorporated herein by reference, in their entireties) in developing helmets to lessen the energy transmitted from oblique blows (i.e. which combine both tangential and radial components), by absorbing or dissipating rotation energy and/or redirecting it into translational energy rather than rotational energy.

Such oblique impacts (in the absence of protection) result in both translational acceleration and angular acceleration of the brain. Angular acceleration causes the brain to rotate within the skull creating injuries on bodily elements connecting the brain to the skull and also to the brain itself.

Examples of rotational injuries include Mild Traumatic Brain Injuries (MTBI) such as concussion, and Severe Traumatic Brain Injuries (STBI) such as subdural haematomas (SDH), bleeding as a consequence of blood vessels rapturing, and diffuse axonal injuries (DAI), which can be summarized as nerve fibres being over stretched as a consequence of high shear deformations in the brain tissue.

Depending on the characteristics of the rotational force, such as the duration, amplitude and rate of increase, either concussion, SDH, DAI or a combination of these injuries can be suffered. Generally speaking, SDH occur in the case of accelerations of short duration and great amplitude, while DAI occur in the case of longer and more widespread acceleration loads.

In helmets such as those disclosed in WO 2001/045526 and WO 2011/139224 that may reduce the rotational energy transmitted to the brain caused by oblique impacts, the first and second parts of the helmet may be configured to slide relative to each other following an oblique impact. However, it remains desirable for the first and second parts to be connected such that the helmet retains its integrity during normal use, namely when not subject to an impact. It is therefore desirable to provide connectors that, whilst connecting first and second parts of a helmet together, permit movement of the first part relative to the second part under an impact. It is also desirable to provide connectors within a helmet that can be provided without substantially increasing the manufacturing costs and/or effort.

The connectors in WO 2017/157765 address some of issues mentioned above. However, they can be relatively fiddly and time-intensive to manufacture. The present invention aims to at least partially address this problem by providing an easy to manufacture connector that permits relative movement under impact.

According to an aspect of the present invention, there is provided a connector for connecting first and second parts of an apparatus, comprising: a first plate; a first anchor point on one side of the first plate, configured to be connected to the first part; a second plate located on an opposite side of the first plate from the first anchor point; a second anchor point on an opposite side of the second plate from the first plate, configured to be connected to the second part; a low friction interface provided between opposing surfaces of the first and second plates; and a cuff of deformable material provided around the first and second plates, and configured to at least partially cover the side of the first plate on which the first anchor point is located and to at least partially cover the side of the second plate on which the second anchor point is located. By providing a deformable cuff around the two plates, the plates are held together but can still slide relative to each other. This allows for a simple construction to achieve a sliding connector.

Optionally, the cuff of deformable material does not cover the first or second anchor points. This ensures the cuff does not interfere with the attachment of the anchor points to the first and second parts of the apparatus being connected.

Optionally, the cuff of deformable material extends, at a plurality of points around a perimeter of the first plate on which the first anchor point is located, to the side of the second plate on which the second anchor point is located. Alternatively the cuff can entirely surround the perimeters of the first and second plates. Changing the number/extent of points at which the two sides of the cuff connect around the plates can change the extent of motion allowed by the connector.

Optionally, the cuff of deformable material is substantially elastically deformable. This assists in the construction of the connector, allowing the connector to be stretched to fit around the plates. Optionally, the cuff of deformable material comprises an elasticated fabric, cloth or textile, or an elastomeric material.

Optionally, the cuff of deformable material is not bonded or attached to the first or second plate. This helps simplify the manufacturing process.

Optionally, the low friction interface is implemented by at least one of using at least one low friction material for the construction of the element forming at least one of the opposing surfaces, applying a low friction coating to at least one of the opposing surfaces, applying a lubricant to at least one of the opposing surfaces, and providing an unsecured additional layer of material between the opposing surfaces that has at least one low friction surface.

Optionally, the cuff of deformable material is configured to bias the first and second plates towards a first position, such that when the first and second plates are displaced away from the first position by sliding along the low friction interface, the cuff of deformable material urges the first and second plates back into the first position.

Optionally, at least one of the first or second anchor points is configured to be detachably connected to the first or second part of the apparatus respectively. Optionally, the at least one of the first or second anchor points is configured to be detachably connected by at least one of a hook and loop connection, a snap-fit connection and a magnetic connector.

Optionally, at least one of the first or second anchor points is configured to be non-releasably connected to the first or second part of the apparatus respectively. Optionally, the at least one of the first or second anchor points is configured to be connected by an adhesive, stitching, or high frequency welding.

According a second aspect of the invention, there is provided a liner for a helmet, comprising at least one connector according to the first aspect.

Optionally, the first anchor point of the at least one connector is connected to the liner, and the second anchor point of the at least one connector is configured to be connected to the helmet.

Optionally, the liner comprises comfort padding and optionally a layer of relatively hard material, compared to the comfort padding, provided more outwardly than the comfort padding.

According a third aspect of the invention, there is provided a helmet, comprising a liner according to the second aspect.

Optionally, the liner is removable from the helmet.

Optionally, the second anchor point of the at least one connector is connected to at least one of a relatively hard outer shell of the helmet, an energy absorbing layer of material in the helmet and a relatively hard layer of material provided more inwardly within the helmet than the energy absorbing material of the helmet.

Optionally, the helmet comprises in turn, an outer shell formed from a relatively hard material, one or more layers of energy absorbing material, an inner shell formed from a relatively hard material, and the liner.

Optionally, a low friction interface is provided between the energy absorbing material and the inner shell. Optionally, the low friction interface is implemented by at least one of using at least one low friction material for the construction of the inner shell and the energy absorbing material, applying a low friction coating to at least one of the opposing surfaces of the inner shell and the energy absorbing material, and applying a lubricant to at least one of the opposing surfaces of the inner shell and the energy absorbing material.

Optionally, the first anchor point is high frequency welded to the liner, and the second anchor point is attached to the helmet by a hook and loop connection.

According a fourth aspect of the invention, there is provided a comprising a plurality of independent sections of comfort padding, each mounted to the helmet by at least one connector according to the first aspect.

Optionally, the helmet comprises in turn, an outer shell formed from a relatively hard material, one or more layers of energy absorbing material, an inner shell formed from a plurality of sections relatively hard material, and the energy absorbing material.

Optionally, a low friction interface is provided between the inner shell and the plurality of sections of comfort padding. Optionally, the low friction interface is implemented by at least one of using at least one low friction material for the construction of the plurality of sections inner shell and the energy absorbing material, applying a low friction coating to at least one of the opposing surfaces of the plurality of sections inner shell and the energy absorbing material, and applying a lubricant to at least one of the opposing surfaces of the plurality of sections inner shell and the energy absorbing material.

Optionally, the first anchor point of the at least one connector is high frequency welded to a section of comfort padding, and the second anchor point is attached to the helmet by a hook and loop connection.

According a fifth aspect of the invention, there is provided a plurality of sections of comfort padding for use within a helmet, wherein each section of comfort padding comprises at least one connector according to the first aspect.

According to a sixth aspect of the invention, there is provided a helmet comprising in turn, i.e. in the order they are encountered from the outside of the helmet to the inside: an outer shell formed from a relatively hard material, one or more layers of energy absorbing material, and a liner or a plurality of sections of comfort padding; wherein the a relatively hard coating is bonded to the outer surface of the liner or plurality of sections of comfort padding, to form a low friction interface between the relatively hard coating and the energy absorbing layer.

Optionally, the helmet further comprises at least one connector according to the first aspect, connecting the liner or a section of comfort padding to the rest of the helmet, for example to the energy absorbing layer.

The invention is described in detail, below, with reference to the accompanying figures, in which.

Figure 1:
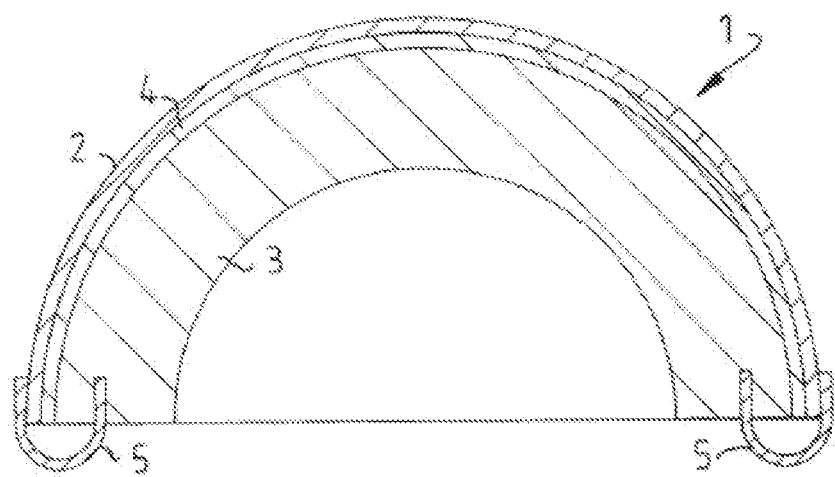
FIG. 1 depicts a cross-section through a helmet for providing protection against oblique impacts.

The proportions of the thicknesses of the various layers in the helmets depicted in the figures have been exaggerated in the drawings for the sake of clarity and can of course be adapted according to need and requirements.

FIG. 1 depicts a first helmet 1 of the sort discussed in WO 01/45526, intended for providing protection against oblique impacts. This type of helmet could be any of the types of helmet discussed above.

Protective helmet 1 is constructed with an outer shell 2 and, arranged inside the outer shell 2, an inner shell 3 that is intended for contact with the head of the wearer.

Arranged between the outer shell 2 and the inner shell 3 is a sliding layer 4 or a sliding facilitator, and thus makes possible displacement between the outer shell 2 and the inner shell 3. In particular, as discussed below, a sliding layer 4 or sliding facilitator may be configured such that sliding may occur between two parts during an impact. For example, it may be configured to enable sliding under forces associated with an impact on the helmet 1 that is expected to be survivable for the wearer of the helmet 1. In some arrangements, it may be desirable to configure the sliding layer or sliding facilitator such that the coefficient of friction is between 0.001 and 0.3 and/or below 0.15.

Arranged in the edge portion of the helmet 1, in the FIG. 1 depiction, may be one or more connecting members 5 which interconnect the outer shell 2 and the inner shell 3. In some arrangements, the connectors may counteract mutual displacement between the outer shell 2 and the inner shell 3 by absorbing energy. However, this is not essential. Further, even where this feature is present, the amount of energy absorbed is usually minimal in comparison to the energy absorbed by the inner shell 3 during an impact. In other arrangements, connecting members 5 may not be present at all.

Further, the location of these connecting members 5 can be varied (for example, being positioned away from the edge portion, and connecting the outer shell 2 and the inner shell 3 through the sliding layer 4).

The outer shell 2 is preferably relatively thin and strong so as to withstand impact of various types. The outer shell 2 could be made of a polymer material such as polycarbonate (PC), polyvinylchloride (PVC) or acrylonitrile butadiene styrene (ABS) for example. Advantageously, the polymer material can be fibre-reinforced, using materials such as glass-fibre, Aramid, Twaron, carbon-fibre or Kevlar.

The inner shell 3 is considerably thicker and acts as an energy absorbing layer. As such, it is capable of damping or absorbing impacts against the head. It can advantageously be made of foam material like expanded polystyrene (EPS), expanded polypropylene (EPP), expanded polyurethane (EPU), vinyl nitrile foam; or other materials forming a honeycomb-like structure, for example; or strain rate sensitive foams such as marketed under the brand-names Poron™ and D3O™. The construction can be varied in different ways, which emerge below, with, for example, a number of layers of different materials.

Inner shell 3 is designed for absorbing the energy of an impact. Other elements of the helmet 1 will absorb that energy to a limited extend (e.g. the hard outer shell 2 or so-called 'comfort padding' provided within the inner shell 3), but that is not their primary purpose and their contribution to the energy absorption is minimal compared to the energy absorption of the inner shell 3. Indeed, although some other elements such as comfort padding may be made of 'compressible' materials, and as such considered as 'energy absorbing' in other contexts, it is well recognised in the field of helmets that compressible materials are not necessarily 'energy absorbing' in the sense of absorbing a meaningful amount of energy during an impact, for the purposes of reducing the harm to the wearer of the helmet.

A number of different materials and embodiments can be used as the sliding layer 4 or sliding facilitator, for example oil, Teflon, microspheres, air, rubber, polycarbonate (PC), a fabric material such as felt, etc. Such a layer may have a thickness of roughly 0.1-5 mm, but other thicknesses can also be used, depending on the material selected and the performance desired. The number of sliding layers and their positioning can also be varied, and an example of this is discussed below (with reference to FIG. 3B).

As connecting members 5, use can be made of, for example, deformable strips of plastic or metal which are anchored in the outer shell and the inner shell in a suitable manner.

Figure 2:
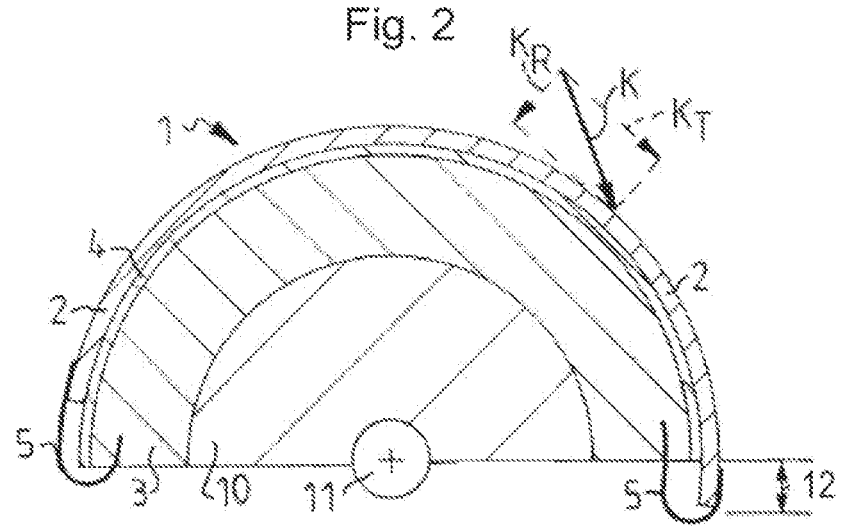
FIG. 2 is a diagram showing the functioning principle of the helmet of FIG. 1.

FIG. 2 shows the functioning principle of protective helmet 1, in which the helmet 1 and a skull 10 of a wearer are assumed to be semi-cylindrical, with the skull 10 being mounted on a longitudinal axis 11. Torsional force and torque are transmitted to the skull 10 when the helmet 1 is subjected to an oblique impact K. The impact force K gives rise to both a tangential force KT and a radial force KR against the protective helmet 1. In this particular context, only the helmet-rotating tangential force KT and its effect are of interest.

As can be seen, the force K gives rise to a displacement 12 of the outer shell 2 relative to the inner shell 3, the connecting members 5 being deformed. A reduction in the torsional force transmitted to the skull 10 of roughly 25% can be obtained with such an arrangement. This is a result of the sliding motion between the inner shell 3 and the outer shell 2 reducing the amount of energy which is transferred into radial acceleration.

Sliding motion can also occur in the circumferential direction of the protective helmet 1, although this is not depicted. This can be as a consequence of circumferential angular rotation between the outer shell 2 and the inner shell 3 (i.e. during an impact the outer shell 2 can be rotated by a circumferential angle relative to the inner shell 3).

Figure 3A:
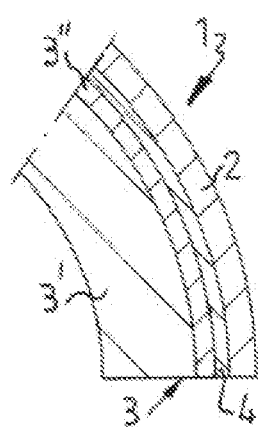
FIGS. 3A, 3B & 3C show variations of the structure of the helmet of FIG. 1.
Figure 3B:
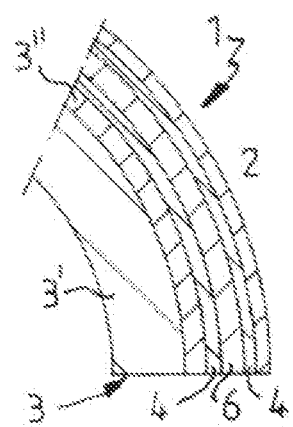
Figure 3C:
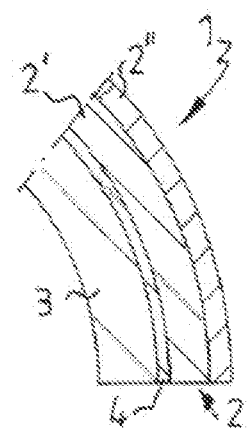

Other arrangements of the protective helmet 1 are also possible. A few possible variants are shown in FIG. 3. In FIG. 3a, the inner shell 3 is constructed from a relatively thin outer layer 3" and a relatively thick inner layer 3'. The outer layer 3" is preferably harder than the inner layer 3', to help facilitate the sliding with respect to outer shell 2. In FIG. 3b, the inner shell 3 is constructed in the same manner as in FIG. 3a. In this case, however, there are two sliding layers 4, between which there is an intermediate shell 6. The two sliding layers 4 can, if so desired, be embodied differently and made of different materials. One possibility, for example, is to have lower friction in the outer sliding layer than in the inner. In FIG. 3c, the outer shell 2 is embodied differently to previously. In this case, a harder outer layer 2" covers a softer inner layer 2'. The inner layer 2' may, for example, be the same material as the inner shell 3.

Figure 4:
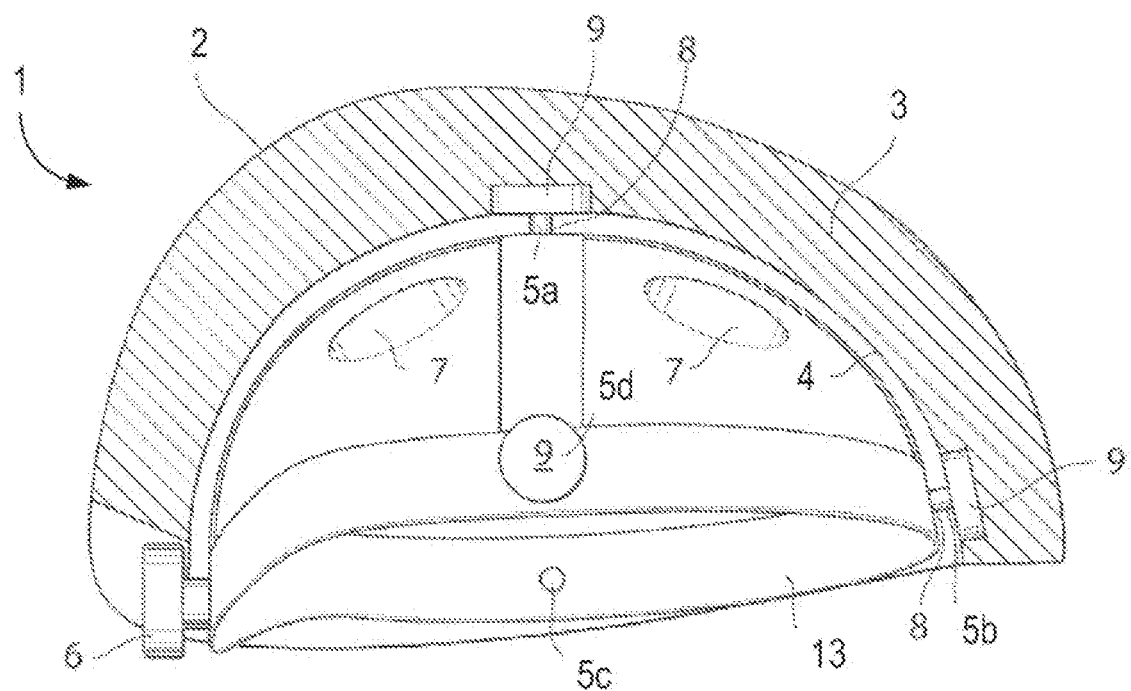
FIG. 4 is a schematic drawing of a another protective helmet.

FIG. 4 depicts a second helmet 1 of the sort discussed in WO 2011/139224, which is also intended for providing protection against oblique impacts. This type of helmet could also be any of the types of helmet discussed above.

In FIG. 4, helmet 1 comprises an energy absorbing layer 3, similar to the inner shell 3 of the helmet of FIG. 1. The outer surface of the energy absorbing layer 3 may be provided from the same material as the energy absorbing layer 3 (i.e. there may be no additional outer shell), or the outer surface could be a rigid shell 2 (see FIG. 5) equivalent to the outer shell 2 of the helmet shown in FIG. 1. In that case, the rigid shell 2 may be made from a different material than the energy absorbing layer 3. The helmet 1 of FIG. 4 has a plurality of vents 7, which are optional, extending through both the energy absorbing layer 3 and the outer shell 2, thereby allowing airflow through the helmet 1.

An attachment device 13 is provided, for attachment of the helmet 1 to a wearer's head. As previously discussed, this may be desirable when energy absorbing layer 3 and rigid shell 2 cannot be adjusted in size, as it allows for the different size heads to be accommodated by adjusting the size of the attachment device 13. The attachment device 13 could be made of an elastic or semi-elastic polymer material, such as PC, ABS, PVC or PTFE, or a natural fibre material such as cotton cloth. For example, a cap of textile or a net could form the attachment device 13.

Although the attachment device 13 is shown as comprising a headband portion with further strap portions extending from the front, back, left and right sides, the particular configuration of the attachment device 13 can vary according to the configuration of the helmet. In some cases the attachment device may be more like a continuous (shaped) sheet, perhaps with holes or gaps, e.g. corresponding to the positions of vents 7, to allow air-flow through the helmet.

FIG. 4 also depicts an optional adjustment device 6 for adjusting the diameter of the head band of the attachment device 13 for the particular wearer. In other arrangements, the head band could be an elastic head band in which case the adjustment device 6 could be excluded.

A sliding facilitator 4 is provided radially inwards of the energy absorbing layer 3. The sliding facilitator 4 is adapted to slide against the energy absorbing layer or against the attachment device 13 that is provided for attaching the helmet to a wearer's head.

The sliding facilitator 4 is provided to assist sliding of the energy absorbing layer 3 in relation to an attachment device 13, in the same manner as discussed above. The sliding facilitator 4 may be a material having a low coefficient of friction, or may be coated with such a material.

As such, in the FIG. 4 helmet, the sliding facilitator may be provided on or integrated with the innermost sided of the energy absorbing layer 3, facing the attachment device 13.

However, it is equally conceivable that the sliding facilitator 4 may be provided on or integrated with the outer surface of the attachment device 13, for the same purpose of providing slidability between the energy absorbing layer 3 and the attachment device 13. That is, in particular arrangements, the attachment device 13 itself can be adapted to act as a sliding facilitator 5 and may comprise a low friction material.

In other words, the sliding facilitator 4 is provided radially inwards of the energy absorbing layer 3. The sliding facilitator can also be provided radially outwards of the attachment device 13.

When the attachment device 13 is formed as a cap or net (as discussed above), sliding facilitators 4 may be provided as patches of low friction material.

The low friction material may be a waxy polymer, such as PTFE, ABS, PVC, PC, Nylon, PFA, EEP, PE and UHMWPE, or a powder material which could be infused with a lubricant. The low friction material could be a fabric material. As discussed, this low friction material could be applied to either one, or both of the sliding facilitator and the energy absorbing layer The attachment device 13 can be fixed to the energy absorbing layer 3 and/or the outer shell 2 by means of fixing members 5, such as the four fixing members 5a, 5b, 5c and 5d in FIG. 4. These may be adapted to absorb energy by deforming in an elastic, semi-elastic or plastic way. However, this is not essential. Further, even where this feature is present, the amount of energy absorbed is usually minimal in comparison to the energy absorbed by the energy absorbing layer 3 during an impact.

According to the embodiment shown in FIG. 4 the four fixing members 5a, 5b, 5c and 5d are suspension members 5a, 5b, 5c, 5d, having first and second portions 8, 9, wherein the first portions 8 of the suspension members 5a, 5b, 5c, 5d are adapted to be fixed to the attachment device 13, and the second portions 9 of the suspension members 5a, 5b, 5c, 5d are adapted to be fixed to the energy absorbing layer 3.

Figure 5:
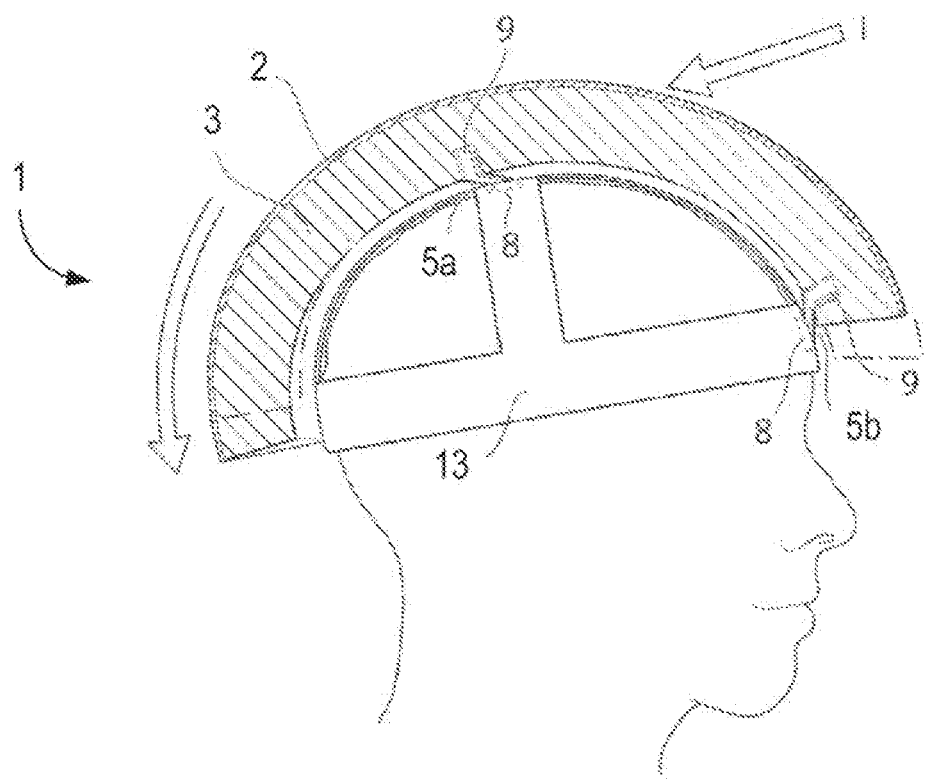
FIG. 5 depicts an alternative way of connecting the attachment device of the helmet of FIG. 4.

FIG. 5 shows an embodiment of a helmet similar to the helmet in FIG. 4, when placed on a wearers' head. The helmet 1 of FIG. 5 comprises a hard outer shell 2 made from a different material than the energy absorbing layer 3. In contrast to FIG. 4, in FIG. 5 the attachment device 13 is fixed to the energy absorbing layer 3 by means of two fixing members 5a, 5b, which are adapted to absorb energy and forces elastically, semi-elastically or plastically.

A frontal oblique impact I creating a rotational force to the helmet is shown in FIG. 5. The oblique impact I causes the energy absorbing layer 3 to slide in relation to the attachment device 13. The attachment device 13 is fixed to the energy absorbing layer 3 by means of the fixing members 5a, 5b. Although only two such fixing members are shown, for the sake of clarity, in practice many such fixing members may be present. The fixing members 5 can absorb the rotational forces by deforming elastically or semi-elastically. In other arrangements, the deformation may be plastic, even resulting in the severing of one or more of the fixing members 5. In the case of plastic deformation, at least the fixing members 5 will need to be replaced after an impact. In some case a combination of plastic and elastic deformation in the fixing members 5 may occur, i.e. some fixing members 5 rupture, absorbing energy plastically, whilst other fixing members deform and absorb forces elastically.

In general, in the helmets of FIG. 4 and FIG. 5, during an impact the energy absorbing layer 3 acts as an impact absorber by compressing, in the same way as the inner shell of the FIG. 1 helmet. If an outer shell 2 is used, it will help spread out the impact energy over the energy absorbing layer 3. The sliding facilitator 4 will also allow sliding between the attachment device and the energy absorbing layer. This allows for a controlled way to dissipate energy that would otherwise be transmitted as rotational energy to the brain. The energy can be dissipated by friction heat, energy absorbing layer deformation or deformation or displacement of the fixing members. The reduced energy transmission results in reduced rotational acceleration affecting the brain, thus reducing the rotation of the brain within the skull. The risk of rotational injuries including MTBI and STBI such as subdural haematomas, SDH, blood vessel rapturing, concussions and DAI is thereby reduced.

Connectors of the present invention for connecting two parts of an apparatus are described below. It should be appreciated that these connectors may be used in a variety of contexts and are not be limited to use within helmets. For example, they may be used in other devices that provide impact protection, such as body armour or padding for sports equipment. In the context of helmets, the connectors of the present invention may, in particular, be used in place of the previously known connecting members and/or fixing members of the arrangements discussed above.

Figure 6:
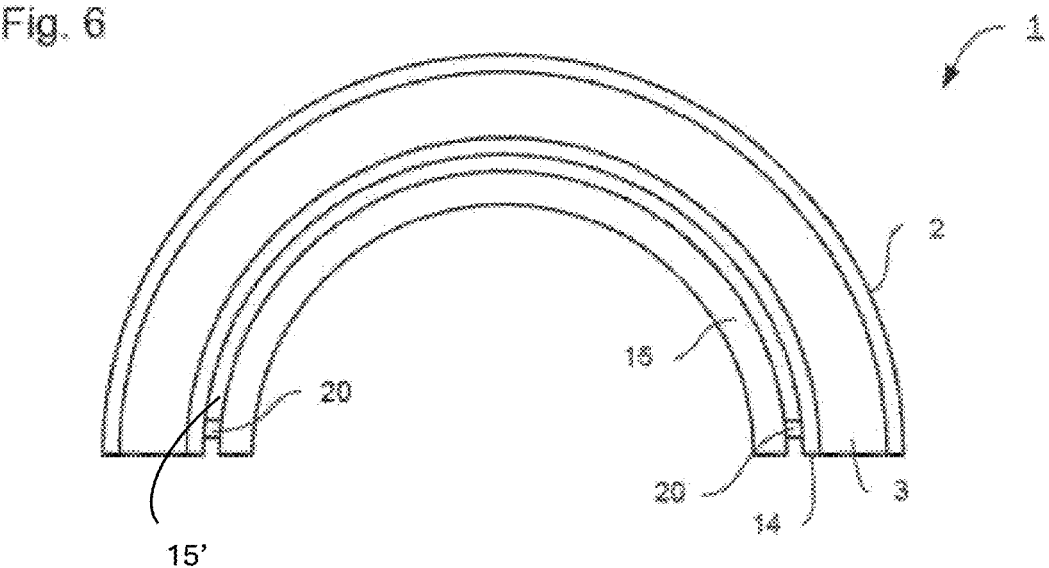
FIG. 6 depicts, in cross-section, a helmet according to an embodiment of the present invention.

In an embodiment of the invention, the connector may be used with a helmet 1 of the type shown in FIG. 6. The helmet shown in FIG. 6 has a similar configuration to that discussed above in respect of FIGS. 4 and 5. In particular, the helmet has a relatively hard outer shell 2 and an energy absorbing layer 3. A head attachment device is provided in the form of a helmet liner 15. The liner 15 may include comfort padding as discussed above. In general, the liner 15 and/or any comfort padding may not absorb a significant proportion of the energy of an impact in comparison with the energy absorbed by the energy absorbing layer 3.

The liner 15 may be removable. This may enable the liner to be cleaned and/or may enable the provision of liners that are modified to fit a specific wearer.

Between the liner 15 and the energy absorbing layer 3, there is provided an inner shell 14 formed from a relatively hard material, namely a material that is harder than the energy absorbing layer 3. The inner shell 14 may be moulded to the energy absorbing layer 3 and may be made from any of the materials discussed above in connection with the formation of the outer shell 2.

In the arrangement of FIG. 6, a low friction interface 15' is provided between the inner shell 14 and the liner 15. This may be implemented by the appropriate selection of at least one of the material used to form the outer surface of the liner 15 or the material used to form the inner shell 14. Alternatively or additionally, a low friction coating may be applied to at least one of the opposing surfaces of the inner shell 14 and the liner 15. Alternatively or additionally, a lubricant may be applied to at least one of the opposing surfaces of the inner shell 14 and the liner 15.

As shown, the liner 15 may be connected to the remainder of the helmet 1 by way of one or more connectors 20 of the present invention, discussed in further detail below. Selection of the location of the connectors 20 and the number of connectors 20 to use may depend upon the configuration of the remainder of the helmet. Accordingly, the present invention is not limited to the configuration depicted in FIG. 6.

In an arrangement such as shown in FIG. 6, at least one connector 20 may be connected to the inner shell 14. Alternatively or additionally, one or more of the connectors 20 may be connected to another part of the remainder of the helmet 1, such as the energy absorbing layer 3 and/or the outer shell 2. The connectors 20 may also be connected to two or more parts of the remainder of the helmet 1.

Figure 7:
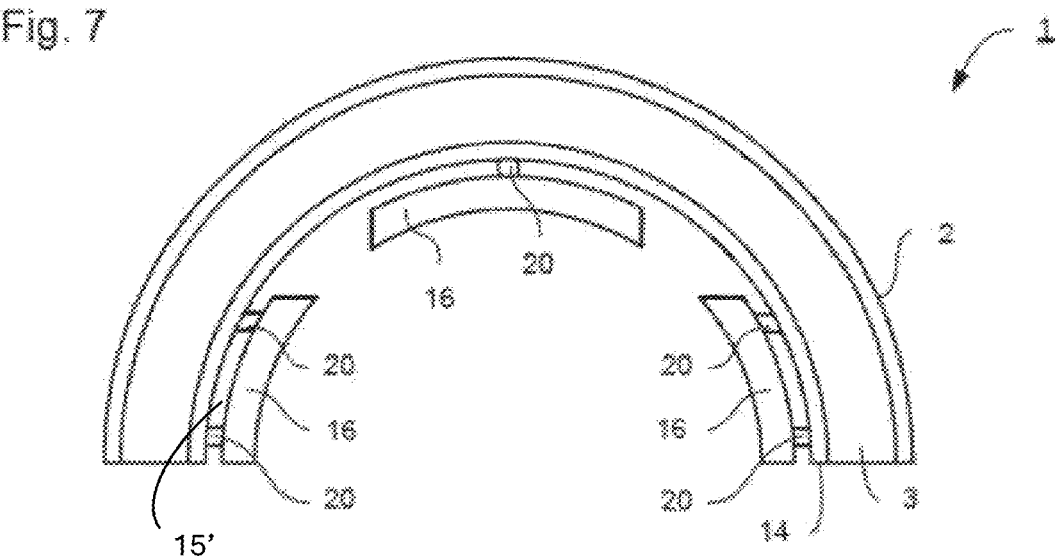
FIG. 7 depicts, in cross section, a helmet according to an embodiment of the present invention.

FIG. 7 depicts a further alternative arrangement of a helmet 1 using the connectors 20 of the present invention. As shown, the helmet 1 of this arrangement includes a plurality of independent sections of comfort padding 16. Each section of comfort padding 16 may be connected to the remainder of the helmet by one or more connectors 20 according to the present invention.

The sections of comfort padding 16 may have a sliding interface provided between the sections of comfort padding 16 and the remainder of the helmet 1. In such an arrangement, the sections of comfort padding 16 may provide a similar function to that of the liner 15 of the arrangement shown in FIG. 6. The options discussed above for provision of a sliding interface between a liner and a helmet also apply to the sliding interface between the sections of comfort padding and the helmet.

It should also be appreciated that the arrangement of FIG. 7, namely the provision of a plurality of independently mounted sections of comfort padding 16 provided with a sliding interface between the sections of comfort padding 16 and the remainder of the helmet may be combined with any form of helmet, including those such as depicted in FIGS. 1 to 5 that also have a sliding interface provided between two other parts of the helmet.

Connectors 20 according to the present invention will now be described. For convenience, the connectors 20 will be described in the context of a connector for connecting a liner 15 to the remainder of a helmet 1 as depicted in FIG. 6. However, it should be appreciated that the connector 20 of the present invention may be used for connecting any two parts of an apparatus together. Furthermore, where below the connector 20 is described as having a first component connected to a first part of an apparatus, such as a helmet liner 15, and a second component connected to a second part of an apparatus, such as the remainder of the helmet 1, it should be appreciated that, with suitable modifications, this may be reversed.

Figure 8:
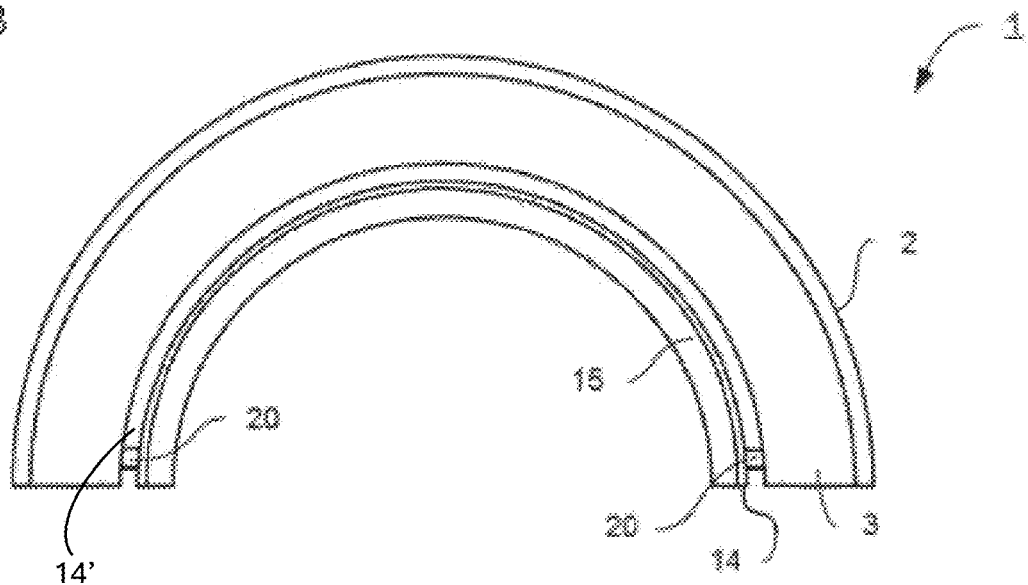
FIG. 8 depicts, in cross-section, a helmet according to another embodiment of the present invention.
Figure 9:
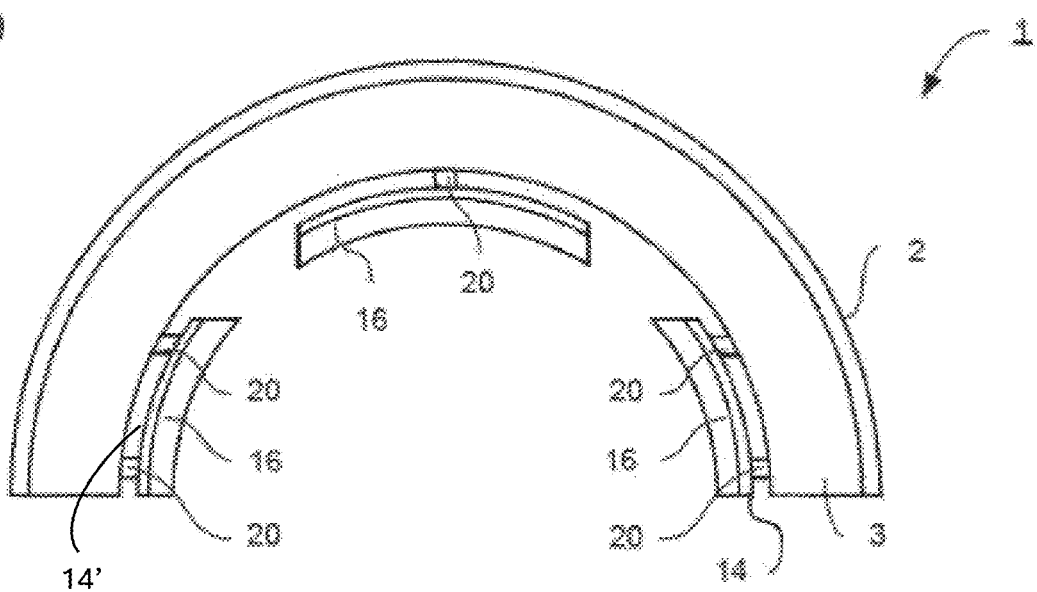
FIG. 9 depicts, in cross section, a helmet according to another embodiment of the present invention.

FIGS. 8 and 9 show equivalent embodiments to those of FIGS. 6 and 7, except that the inner shell 14 is applied to the liner 15 (in FIG. 8) or comfort padding 16 (in FIG. 9). In the case of FIG. 9, the inner shell 14 may only be a partial shell or a plurality of sections of shell, as compared to the substantially full shell arrangements of FIGS. 6 to 8. Indeed, in both FIGS. 8 and 9 the inner shell 14 may also be characterised as a relatively hard coating on the liner 15 or comfort padding 16. As for FIGS. 6 and 7, the inner shell 14 is formed from a relatively hard material, namely a material that is harder than the energy absorbing layer 3. For example, the material could be PTFE, ABS, PVC, PC, Nylon, PFA, EEP, PE and UHMWPE. The material may be bonded to the outer side of the liner 15 or comfort padding 16 to simplify the manufacturing process. Such bonding could be through any means, such as by adhesive or by high frequency welding.

In FIGS. 8 and 9 a low friction interface 14' is provided between the inner shell 14 and the energy absorbing layer 3. This may be implemented by the appropriate selection of at least one of the material used to form the outer surface of the energy absorbing layer 3 or the material used to form the inner shell 14. Alternatively or additionally, a low friction coating may be applied to at least one of the opposing surfaces of the inner shell 14 and the energy absorbing layer 3. Alternatively or additionally, a lubricant may be applied to at least one of the opposing surfaces of the inner shell 14 and the energy absorbing layer 3.

In FIGS. 8 and 9, at least one connector 20 may be connected to the inner shell 14. Alternatively or additionally, one or more of the connectors 20 may be connected to another part of the remainder of the liner 15 or comfort padding 16.

Figure 10:
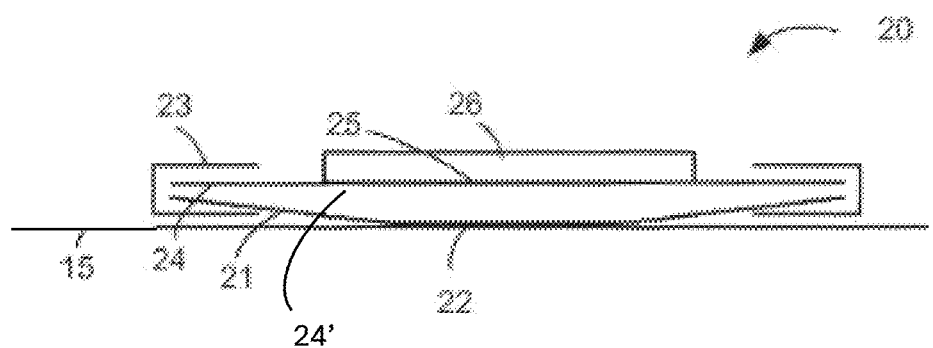
FIG. 10 depicts, in cross-section, a connector according to an embodiment of the present invention.

FIG. 10 depicts, in cross-section, an embodiment of a connector 20 according to the present invention that may be used to connect first and second parts of an apparatus, such as a helmet. In particular it may be configured to connect a liner 15 to the remainder of a helmet.

In the arrangement depicted in FIG. 10, the connector 20 includes a first sliding plate 21 with an anchor point 22 on one side of the plate 21. On the other side of the first plate 21 to the anchor point 22, a second sliding plate 24 is provided, having an anchor point 25 on the side facing away from the first plate 21. Whilst the sliding plate 21 is shown as slightly concave in FIG. 10, this is to illustrate the anchor point 22 and bonding to the underlying layer 15. In practice, the plates 21 and 24 are both substantially flat at rest.

The sliding plates 21, 24 may be formed from a sufficiently stiff material that they substantially retain their shape during expected use of the apparatus. In the context of a helmet, this may include normal handling of the helmet and wearing the helmet under normal conditions. It may also include conditions including an impact on the helmet for which the helmet is designed with the expectation that the impact would be survivable for the wearer of the helmet.

In the arrangement depicted in FIG. 10, the first sliding plate 21 is provided adjacent to the surface of the second part, such as the liner 15, such that the plate 21 may slide on the surface of the liner 15 (e.g. rotationally around the attachment point 25).

In order to ensure that the first sliding plate 21 can slide relative to the second sliding plate 24, a low friction interface 24' may be provided between the opposing surfaces of the two plate 21, 24.

In this context, a low friction interface 24' may be configured such that sliding contact is still possible even under the loading that may be expected in use. In the context of a helmet, for example, it may be desirable for sliding to be maintained in the event of an impact that this expected to be survivable for the wearer of a helmet. This may be provided, for example, by the provision of an interface between the two surfaces at which the coefficient of friction is between 0.001 and 0.3 and/or below 0.15.

In the present invention, a low friction interface 24' may be implemented by at least one of using at least one low friction material for the construction of the element forming at least one of the opposing surfaces of the plates 21, 24, applying a low friction coating to at least one of the opposing surfaces, applying a lubricant to at least one of the opposing surfaces, and providing an unsecured additional layer of material between the opposing surfaces that has at least one low friction surface.

The plates used in the connector of the present invention may be made from a variety of different materials. In an example, a plate may be made from polycarbonate (PC), polyvinylchloride (PVC), acrylonitrile butadiene styrene (ABS), polypropylene (PP), Nylon or another plastic. The plates may optionally have a thickness in the range of from approximately 0.2 mm to approximately 1.5 mm, for example approximately 0.7 mm thick.

The anchor point 22 of the first plate 21 is depicted in FIG. 10 in the form of a point at which the first plate 21 is attached by high frequency welding to the liner 15. However, other methods of 'permanent' or non-releasable attachment may be used, such using an adhesive or stitching.

The anchor point 25 of the second plate 24 is depicted in FIG. 10 in the form of a point at which one side of a hook and loop connector 26 is attached (the other side being on the part to be connected, e.g. a helmet). However, other methods of 'detachable' attachment may be used, such as a snap-fit connection or a magnetic connector. Other forms of detachable connection may also be used.

Whilst the anchor point 22 of the first plate 21 has been discussed above for use with permanent' attachments, and the anchor point 25 of the second plate 2524 has been discussed with 'detachable' attachments in the arrangement of FIG. 10, either anchor point 22, 25 may be used for either permanent or detachable attachments. Either type of attachment may be configured such that it prevents translational movement of an anchor point 22, 25 relative to the part being connected to. However, it may be configured such that the anchor point 22, 25 and therefore the respective plate 21, 24 can rotate about one or more axes of rotation relative to the part being connected to. Alternatively or additionally, the anchor points 22, 25 may be connected to the parts to be connected by way of one or more additional components.

Both anchor points 22, 25 are depicted as being substantially level with first and second plates 21, 24. However, the anchor points may include protrusions, as illustrated in WO 2017/157765, which is herein incorporated in its entirety by reference.

When viewed in plan view, the anchor points 22, 25 may be arranged substantially at the centre of their respective plates 21, 24. However, the present invention is not limited to a particular configuration. When viewed in plan view, any convenient shape of the plates 21, 24 may be used, for example substantially rectangular, substantially square, substantially circular or substantially elliptical. In the case of a shape having corners, the corners may be rounded in order to minimise the risk of the plate getting caught on another part of the connector or another component.

Figure 11:
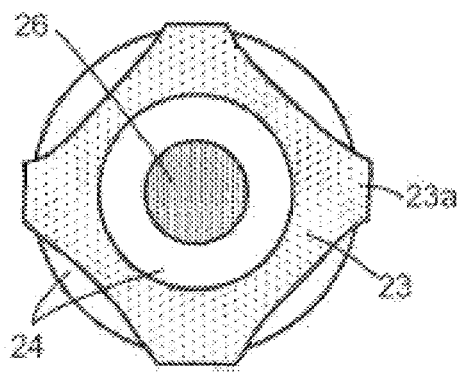
FIG. 11 depicts, in plan view, a connector according to FIG. 10.

A cuff or collar 23 of deformable material is provided that at least partially covers the sides of the plates 21, 24 incorporating the anchor points 22, 25. That is the cuff at least partially covers the side of the first plate 21 on which the first anchor point 22 is located and at least partially covers the side of the second plate 24 on which the second anchor point 25 is located. In other words, at least several points 23a around the perimeter of the cuff 23, as illustrated in FIG. 11, wrap around the outer edge of the plates 21, 24. In some arrangements, the entire outer edge of the plates may be covered by the cuff 23, rather than just parts as shown in FIG. 11.

As illustrated, the cuff 23 does not cover the anchor points 22, 25 of the connector 20. That is, the anchor points 22, 25 project through apertures or gaps in the cuff 23. This can be seen in the cross-sectional view of FIG. 10 and in plan view for the anchor point 25 of the second plate in FIG. 11. This avoids cuff 23 interfering with the connection to the surrounding first and second parts to be connected.

The cuff 23 is not necessarily directly attached or bonded to the plates 21, 24. Instead, the cuff 23 can be provided as a close fit around the plates 21, 24, such that it stays in place due to the mechanical interaction with the plates 21, 24. Indeed, to initially fit the plates 21, 24 within the cuff 23, it may be necessary to stretch the cuff 23 and/or bend the plates 21, 24.

The construction of the cuff 23 and plates 21, 24 into the connector 20 can take place in different ways. In one approach, the cuff 23 can be provided around both plates 21, 24 before the anchor points 22, 25 are fixed to the parts to be connected. In another approach, the anchor points 22, 25 can be fixed to the parts to be connected before the cuff 23 is provided around the plates 21, 24. In another approach, one plate, e.g. plate 21 can be attached to a first component to be connected via the anchor point 22, whilst the other plate 24 is fitted to the cuff 23. The first plate 21 can then also be fitted into the cuff 23 before the second plate 24 is fixed to a second component to be connected via its anchor point 25.

Thereafter, as the plates 21, 24 slide over the low friction interface (e.g. during an impact), they change their relative positions and deform the cuff 23. As such, the cuff 23 defines a natural resting position of the plates 21, 24 relative to the first and second parts of the surrounding apparatus to which they connect via the anchor points 22, 25. However, by deformation of the deformable material 23 during displacement of the plates 21, 24, for example stretching of one side of the deformable material, the plates 21, 24 are permitted to slide. In doing so, the second part of the apparatus, such as the remainder of the helmet, which may be connected to the second anchor point 25, may slide relative to the first part of the apparatus, such as the liner 15, connected to the first anchor point 22.

A connector 20 of the present invention may be configured to permit a desired relative range of movement of the anchor points 22, 25, and therefore the relative range of movement between the first part of the apparatus the second part of the apparatus being connected. Such configuration may be achieved by the selection of the material forming the cuff 23, the thickness of the material forming the cuff 23 and the number of points 23a around the perimeter at which the top layer of the cuff 23 is connected to the bottom layer. For example, a connector 20 for use within a helmet may be configured to enable a relative movement between the anchor points 22, 25 of approximately 5 mm or more in any direction within a plane parallel to the major surface of the plates 21, 24.

The cuff 23 can be formed of material that deforms substantially elastically for the required range of movement of the plate 21 relative to the second part. For example, the deformable material may be formed from at least one of an elasticated fabric, an elasticated cloth, an elasticated textile and an elastomeric material, e.g. a elastomeric polymeric material such as silicone/polysiloxane.

By providing an elastically deformable cuff 23, after the first and second plates 21, 24 have been displaced away from the first, resting, position, and the cuff 23 has been stretched, the cuff 23 will urge the first and second plates 21, 24 back into the first position. In other words, the cuff 23 biases the first and second plates 21, 24 towards the first position The cuff 23 may be formed as a single piece, by moulding for example, or may be formed by connecting together multiple pieces, e.g. an upper layer and a lower layer, subsequently joined at the edges.

The invention claimed is:

1. A helmet comprising first and second parts, and at least one connector connecting the first and second parts of the helmet, the at least one connector comprising:
   a first plate;
   a first anchor point on one side of the first plate, connected to the first part;
   a second plate located on an opposite side of the first plate from the first anchor point;
   a second anchor point on an opposite side of the second plate from the first plate, connected to the second part;
   a low friction interface provided between opposing surfaces of the first and second plates; and
   a cuff of deformable material provided around the first and second plates, and at least partially covering the side of the first plate on which the first anchor point is located and to at least partially cover the side of the second plate on which the second anchor point is located.

2. The helmet according to claim 1, wherein the cuff of deformable material does not cover the first or second anchor points.

3. The helmet according to claim 1, wherein the cuff of deformable material extends, at a plurality of points around a perimeter of the first plate on which the first anchor point is located, to the side of the second plate on which the second anchor point is located.

4. The helmet according to claim 1, wherein the cuff of deformable material is substantially elastically deformable.

5. The helmet according to claim 1, wherein the cuff of deformable material comprises an elasticated fabric, cloth or textile, or an elastomeric material.

6. The helmet according to claim 1, wherein the cuff of deformable material is not bonded or attached to the first or second plate.

7. The helmet according to claim 1, wherein the low friction interface is implemented by at least one of using at least one low friction material for the construction of an element forming at least one of the opposing surfaces, applying a low friction coating to at least one of the opposing surfaces, applying a lubricant to at least one of the opposing surfaces, and providing an unsecured additional layer of material between the opposing surfaces that has at least one low friction surface.

8. The helmet according to claim 1, wherein the cuff of deformable material is configured to bias the first and second plates towards a first position, such that when the first and second plates are displaced away from the first position by sliding along the low friction interface, the cuff of deformable material urges the first and second plates back into the first position.

9. The helmet according to claim 1, wherein at least one of the first or second anchor points is configured to be detachably connected to the first or second part of the helmet respectively.

10. The helmet according to claim 9, wherein the at least one of the first or second anchor points is configured to be detachably connected by at least one of a hook and loop connection, a snap-fit connection and a magnetic connector.

11. The helmet according to claim 1, wherein at least one of the first or second anchor points is configured to be non-releasably connected to the first or second part of the helmet respectively.

12. The helmet according to claim 11, wherein the at least one of the first or second anchor points is configured to be connected by an adhesive, stitching, or high frequency welding.

13. The helmet of claim 1, wherein the first part of the helmet is a helmet liner.

14. The helmet of claim 13, wherein the liner comprises comfort padding and a layer of relatively hard material, compared to the comfort padding, provided more outwardly than the comfort padding.

15. The helmet according to claim 1 wherein the second part of the helmet is one of: a relatively hard outer shell of the helmet that is harder than the energy absorbing layer, an energy absorbing layer of material in the helmet, and a relatively hard layer of material, that is harder than the energy absorbing layer, provided more inwardly within the helmet than an energy absorbing material of the helmet.

16. The helmet according to claim 1, comprising in turn, an outer shell formed from a relatively hard material that is harder than the energy absorbing layer, one or more layers of energy absorbing material, an inner shell formed from a relatively hard material that is harder than the energy absorbing layer, and a liner, the energy absorbing material forming the first part of the helmet and the inner shell forming the second part of the helmet.

17. The helmet according to claim 16, wherein an additional low friction interface is provided between the energy absorbing material and the inner shell.

18. The helmet according to claim 17, wherein the low friction interface is implemented by at least one of using at least one low friction material for the construction of the inner shell and the energy absorbing material, applying a low friction coating to at least one of the opposing surfaces of the inner shell and the energy absorbing material, and applying a lubricant to at least one of the opposing surfaces of the inner shell and the energy absorbing material.

19. The helmet according to claim 1, wherein the first part of the helmet comprises a plurality of independent sections of comfort padding, each mounted to the helmet by said at least one connector.

\* \* \* \* \*